UNITED STATES PATENT OFFICE.

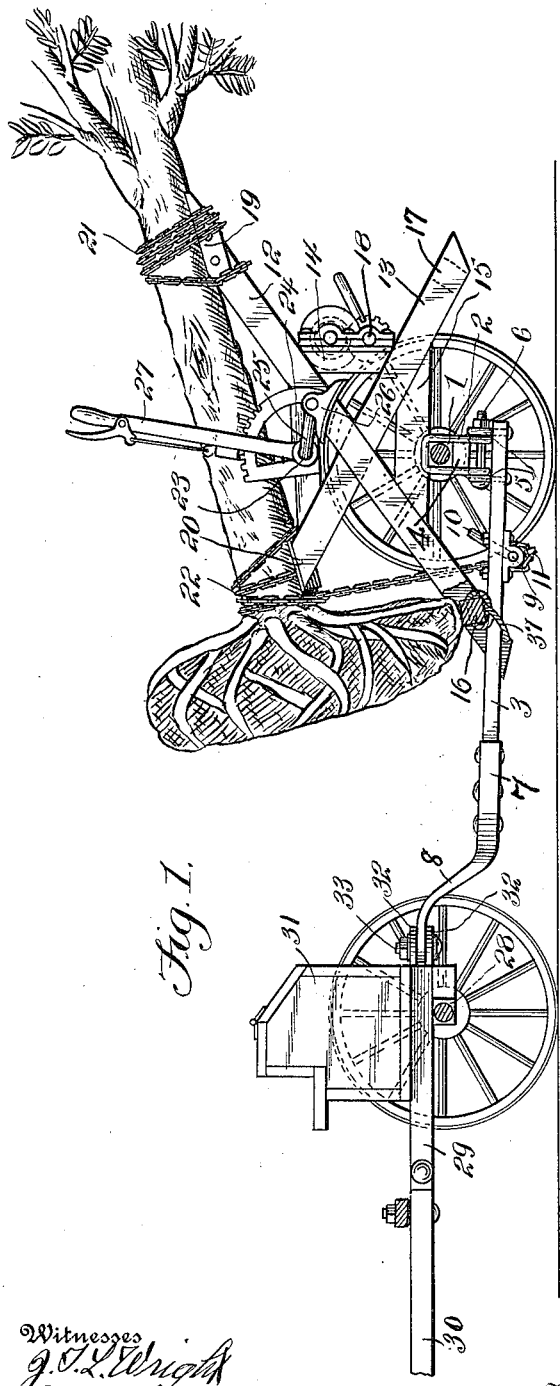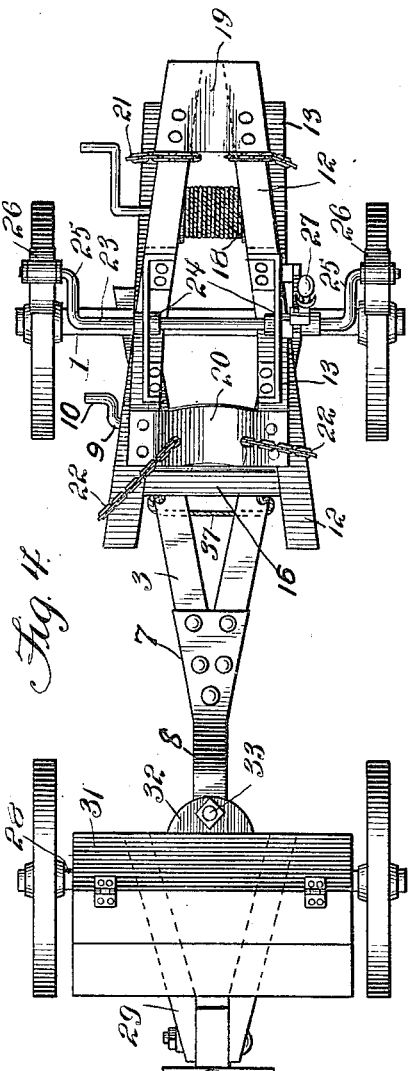

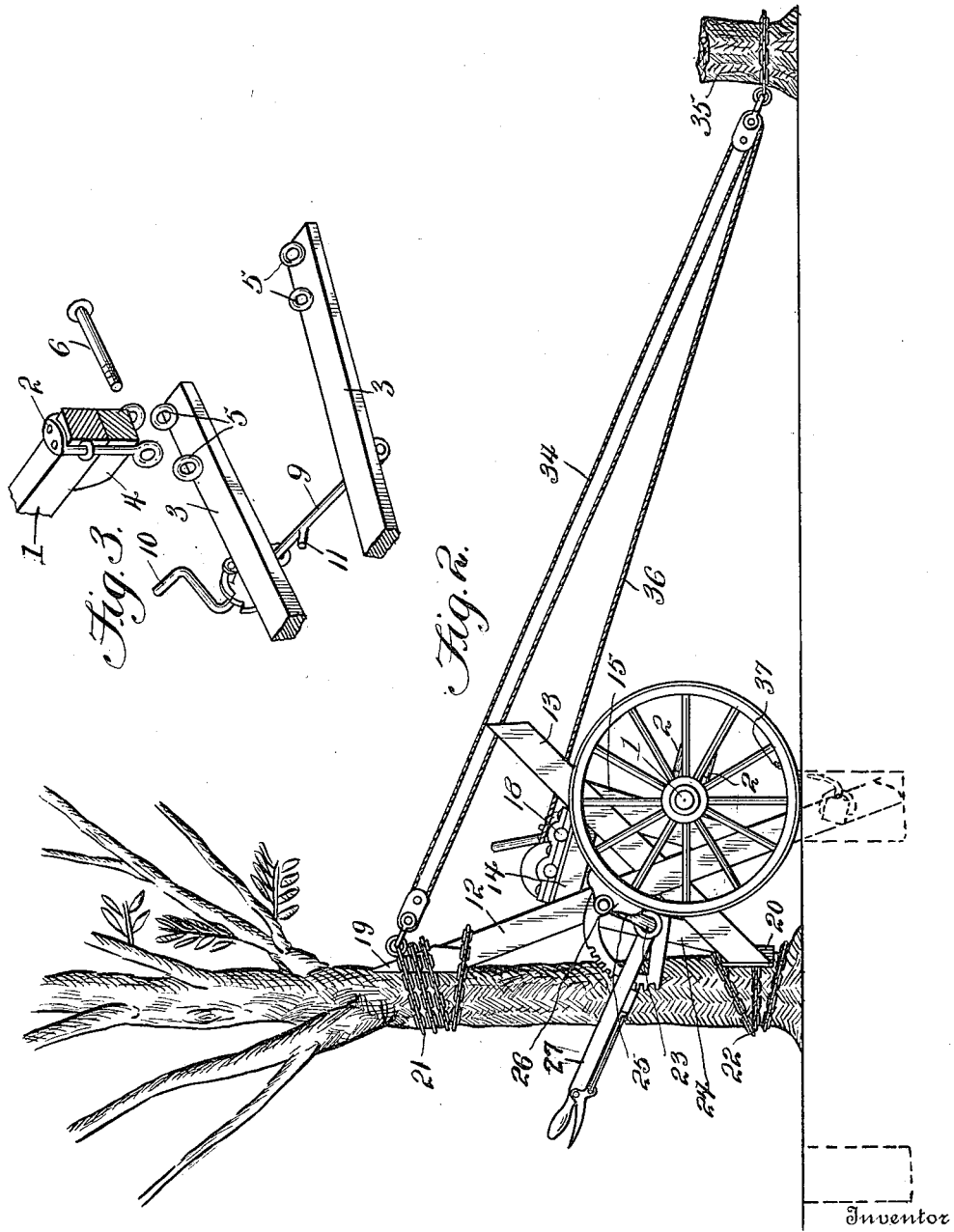

JAMES W. SNODGRASS, OF YOUNGSTOWN, OHIO.

STUMP-PULLER AND TREE-CARRIER.

1,143,455.  Specification of Letters Patent.  Patented June 15, 1915.

Application filed July 25, 1914. Serial No. 853,073.

*To all whom it may concern:*

Be it known that I, JAMES W. SNODGRASS, a citizen of the United States, residing at Youngstown, in the county of Mahoning and State of Ohio, have invented new and useful Improvements in Stump-Pullers and Tree-Carriers, of which the following is a specification.

The present invention provides an appliance designed chiefly for moving trees when transplanting the same and which may be used for extirpating stumps, the appliance being in the nature of a wagon and embodying a crab or windlass and means for applying great force for uprooting the trees or stumps.

The appliance embodies essentially two trucks, a reach forming coupling means between such trucks and a body or structure mounted upon the rear truck and adapted to receive and carry the tree to be transported or to be utilized as means for applying force when it is required to uproot a stump.

The invention consists of a body or structure of peculiar formation which is braced so as to resist strain, both when applying force for uprooting a tree or stump and for sustaining the load when moving the tree from one place to another, said body or structure being provided with a brake and a crab or windlass.

The invention further consists of peculiar connecting means between the reach and the rear truck and body, the connecting means being such as to admit of the reach being placed in position or removed with facility, said reach when in position being adapted to withstand the strain incident to moving an appliance of the nature described when transporting a tree from one place to another.

The invention consists of the novel features, details of construction and combination of parts, which hereinafter will be more particularly set forth, illustrated and claimed.

In the drawings hereto attached:—Figure 1 is a side view of an appliance embodying the invention showing the tree in position for transportation. Fig. 2 is a detail view showing the appliance in position preliminary to applying force for uprooting the tree. Fig. 3 is a detail view showing more clearly the connection between the reach and the main body of the appliance. Fig. 4 is a top plan view.

Corresponding and like parts are referred to in the following description, and indicated in all the views of the drawing, by the same reference characters.

The front and rear trucks are of similar construction, each embodying an axle and wheels. The body or structure for carrying the load or applying the force exerted for uprooting a tree or stump is mounted upon the rear axle 1.

Clips 2 are fitted to end portions of the rear axle 1 and admit of the reach 3 being coupled thereto.

Blocks 4 are located below the axle 1 to admit of the reach 3 occupying a relatively low position. The reach 3 is of V-form and each of the members comprising the same is provided at its rear end with spaced eyes 5 which are adapted to receive a pin 6 by means of which the reach is coupled to the clips 2.

A metal tip 7 is attached to the front ends of the members comprising the reach 3 and is formed with an upwardly and forwardly extending arm 8 which is pivotally connected to the front truck in such a manner as to admit of such truck turning whereby the appliance may be properly steered.

A shaft 9 is mounted upon the rear portion of the reach and is provided at one end with a crank 10 and intermediate of its ends with an arm or offstanding portion 11 which may be utilized for securing the appliance to the tree and preventing the latter from tipping forward or backward.

The body or structure for receiving and carrying the load and also adapted for applying the force exerted for uprooting a tree or stump comprises similar side pieces, each consisting of crossed bars or members 12 and 13 and interposed stay pieces 14 and 15. A cross piece 16 connects the lower rear ends of the members 12 and a cross piece 17 connects the lower ends of the members 13. The stay pieces 15 are interposed between the members 12 and 13 and rest upon the rear axle 1 and are clipped or otherwise secured thereto. The stay pieces 14 interposed between the rear ends of the members 12 and 13 receive and support the crab or windlass 18. Saddles 19 and 20 connect the upper ends of the members 12 and 13 and receive the load which is secured thereto by cables or analogous means 21 and 22. The members 12 and 13 of the side pieces do not extend parallel. The members 12 incline upwardly and rearwardly, whereas the members 13 incline in a reverse direction and as a result the upper forward ends of the members 13 are spaced apart a farther distance than the upper rear ends of the members 12. A shaft 23 is mounted in bearings 24 and is provided at its ends with crank portions 25 to which brake shoes 26 are attached, such brake shoes being arranged to engage the rear wheels thereby admitting of controlling the movement of the appliance. A lever 27 attached to the shaft 23 admits of turning such shaft to apply or release the brake. The bearings 24 preferably consist of rods or bars which are interposed between the upper ends of the members 12 and 13 and are located opposite the angles formed therebetween.

The forward truck embodies an axle 28 to the ends of which are fitted wheels. Hounds 29 are secured to the axle 28 and a pole or tongue 30 is secured in any manner to the hounds 29 and admits of applying the draft to the appliance when drawing the same over the road. A box 31 is mounted upon the truck and is adapted to contain tools and sundry articles. This box also serves as a seat for the driver. Plates 32 are secured to the axle 28 and hounds 29 and the front end of the arm 8 is received between them, a pin 33 passing through vertically alined openings in the plates and arm and serving to pivotally connect the same.

In the practical operation of the appliance for uprooting or extirpating a stump, an excavation is made in the ground near the base of the tree or stump a short distance from the trunk thereof. The front truck and reach, are disconnected from the rear truck and the latter is placed with the lower ends of the members 12 in such excavation thereby bringing the saddles 19 and 20 against the trunk of the tree the latter being secured to the adjacent ends of the members 12 and 13 by means of the cables or analogous means 21 and 22. After the parts 12 and 13 have been securely lashed to the trunk of the tree, a fall and block or like tackle 34 is provided and hitched to the upper lashing and to a stump or like anchorage 35, the loose end of the rope or cable 36 being hitched to the crab or windlass 18 which latter is operated to wind the loose end of the rope or cable 36 thereon. Before winding the loose end of the rope or cable 36 upon the crab 18 a trench is dug around the tree or stump to a suitable depth, approximately 3 to 4 feet and after such trench has been formed the crab 18 is operated with the result that the tree is drawn over and the roots lifted and when the tree has been completely uprooted the base portion of the trunk rests upon the upper ends of the members 13 and the upper portion of the tree is supported upon the upper ends of the members 12, the roots resting upon the lower forward ends of the members 12. The tree being thus supported, the reach 3 is placed in position and coupled to the axle of the rear truck in the manner stated. A sling 37 attached to the cross piece 16 supports the reach 3 intermediate of its ends. By applying the draft to the front truck the appliance may be readily removed so as to transport the tree to the required place. For uprooting stumps the appliance is used in a manner similar to the application described in connection with uprooting a tree.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof I desire to have it understood that the device shown is merely illustrative, and that such changes may be made when desired as are within the scope of the invention as claimed.

Having thus described the invention, what is claimed as new is:—

1. In an appliance of the character specified, the combination of front and rear trucks, a reach pivotally connected at its forward end to the front truck, means detachably connecting the reach with the rear truck, a shaft mounted upon such reach, an arm projecting from the shaft and a crank at one end of the shaft.

2. In an appliance of the character set forth the combination of a truck, crossed members mounted upon such truck, saddles at the upper ends of the members for receiving the load, means for securing the load upon the saddles of the structure and a crab mounted upon the structure.

3. In an appliance of the character set forth the combination of a truck, a structure mounted upon such truck and comprising crossed members, saddles at the upper ends of such members, means for securing the loads upon the saddles and a crab mounted upon the structure and adapted to coöperate with tackle when utilizing the structure for receiving the load.

4. In an appliance of the character specified, the combination of a truck, a structure mounted upon such truck and comprising crossed members, bearings located in the angle formed between the upper ends of such members, a shaft mounted in such bearings and provided at its ends with cranks, brake shoes mounted upon the cranks and adapted to engage the wheels of the truck and a lever for turning the shaft to apply or release the brake.

5. In an appliance of the character described the combination of a truck, crossed members, stay pieces in the angles formed between the lower and rear ends of such members, a crab mounted upon a set of the stay pieces, saddles at the upper ends of the members and coöperating with such members for retaining the load in place thereon.

In testimony whereof I affix my signature in presence of two witnesses.

JAMES W. SNODGRASS.

Witnesses:
MICHAEL FIALLA,
SOPHYE N. OZERSKY.

Copies of this patent may be obtained for five cents each, by addressing the "Commissioner of Patents, Washington, D. C."